United States Patent
Guardala et al.

(10) Patent No.: US 10,996,353 B1
(45) Date of Patent: May 4, 2021

(54) N-TYPE GALLIUM NITRIDE SCINTILLATION FOR FAST-NEUTRON DETECTION

(71) Applicant: The United States of America, as represented by the Secretary of the Navy, Arlington, VA (US)

(72) Inventors: Noel A. Guardala, Columbia, MD (US); Veerendra K. Mathur, Beltsville, MD (US); Johnathan D. Wensman, Washington, DC (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 131 days.

(21) Appl. No.: 16/156,476

(22) Filed: Oct. 10, 2018

Related U.S. Application Data (60) Provisional application No. 62/570,327, filed on Oct. 10, 2017.

(51) Int. Cl.
*G01T 3/06* (2006.01)
*G01T 3/00* (2006.01)
*G01T 3/08* (2006.01)

(52) U.S. Cl.
CPC .............. *G01T 3/065* (2013.01); *G01T 3/003* (2013.01); *G01T 3/085* (2013.01)

(58) Field of Classification Search
CPC ......... G01T 3/065; G01T 3/003; G01T 3/085; G01T 3/06; G01T 3/08; G01T 3/001; C30B 29/406; H01L 31/115; H01L 31/085; H01L 31/1856; H01L 21/02389
See application file for complete search history.

(56) References Cited

U.S. PATENT DOCUMENTS

| | | | |
|---|---|---|---|
| 5,087,815 A | | 2/1992 | Schultz et al. |
| 5,940,460 A | * | 8/1999 | Seidel ............... G01T 3/08 250/370.01 |
| 5,969,359 A | * | 10/1999 | Ruddy ............. G21C 17/063 250/370.05 |
| 7,053,375 B2 | * | 5/2006 | Ando ............... G01T 1/1644 250/361 R |
| 7,727,874 B2 | | 6/2010 | Hanser et al. |

(Continued)

FOREIGN PATENT DOCUMENTS

WO 2015/148544 A1 10/2015

OTHER PUBLICATIONS

Andrew G. Melton, "GaN-Based Neutron Scintillators with a LiF Conversion Layer", Feb. 13, 2012, MRS Proceedings, vol. 1396 (Year: 2012).*

(Continued)

*Primary Examiner* — Dani Fox
*Assistant Examiner* — Soorena Kefayati
(74) *Attorney, Agent, or Firm* — Howard Kaiser (57) ABSTRACT

An inventive neutron detector includes an n-type GaN wafer and a photomultiplier, which are optically coupled with each other. The n-type GaN wafer is irradiated with neutrons from a neutron source, such as including a particle accelerator and a beryllium target. Scintillation of the n-type GaN resulting from the neutron irradiation is amplified by the photomultiplier and is analyzed using a data acquisition system.

15 Claims, 7 Drawing Sheets

(56) References Cited

U.S. PATENT DOCUMENTS

| | | | | |
|---|---|---|---|---|
| 8,648,314 | B1* | 2/2014 | Popov | G01V 5/0025 250/390.11 |
| 8,853,637 | B2 | 10/2014 | Marcus | |
| 8,860,161 | B2 | 10/2014 | Dowben et al. | |
| 9,671,507 | B2* | 6/2017 | Bensaoula | H01L 31/115 |
| 9,864,077 | B2 | 1/2018 | Sellinger et al. | |
| 2002/0067789 | A1* | 6/2002 | Wallace | G01T 3/08 376/154 |
| 2003/0062486 | A1* | 4/2003 | Shimizu | G01T 3/06 250/483.1 |
| 2003/0134493 | A1* | 7/2003 | Cho | H01L 21/3245 438/512 |
| 2004/0256566 | A1* | 12/2004 | Gardner | G01N 23/222 250/360.1 |
| 2005/0258372 | A1* | 11/2005 | McGregor | G01T 1/185 250/390.01 |
| 2006/0255282 | A1* | 11/2006 | Nikolic | G01T 3/08 250/390.01 |
| 2009/0302231 | A1* | 12/2009 | McGregor | G01T 3/08 250/390.03 |
| 2010/0223010 | A1* | 9/2010 | Nikitin | G01V 5/107 702/8 |
| 2010/0304204 | A1* | 12/2010 | Routkevitch | G01T 1/24 429/122 |
| 2011/0095193 | A1* | 4/2011 | Orava | G01T 3/08 250/370.05 |
| 2011/0095194 | A1* | 4/2011 | Orava | H01L 31/115 250/370.05 |
| 2011/0233420 | A1* | 9/2011 | Feller | H01J 47/1205 250/391 |
| 2011/0266448 | A1* | 11/2011 | Burgett | G01T 3/06 250/361 R |
| 2012/0051378 | A1* | 3/2012 | Kar | G01J 1/42 372/38.01 |
| 2013/0344636 | A1* | 12/2013 | Bellinger | H01L 31/18 438/56 |
| 2015/0053863 | A1* | 2/2015 | Cao | H01L 31/03044 250/370.05 |
| 2015/0115164 | A1* | 4/2015 | Feller | H01L 31/08 250/370.05 |
| 2017/0139060 | A1* | 5/2017 | Dahal | G01T 1/24 |
| 2018/0024256 | A1* | 1/2018 | Gendotti | G01T 3/06 250/390.11 |

OTHER PUBLICATIONS

Jinghui Wang, "Review of using gallium nitride for ionizing radiation detection", Sep. 3, 2015, Applied Physics Reviews 2,031102, p. 1-12. (Year: 2015).*

Johnathan Wensman, "Neutron spectroscopy using III-IV semiconductor scintillators", May 22, 2015, CBRNE sensing XVI, 945502, p. 1-7 (Year: 2015).*

U.S. Appl. No. 62/570,327, filed Oct. 10, 2017, entitled "N-Type Gallium Nitride Scintillation for Fast-Neutron Detection," inventors Noel A. Guardala, Veerendra K. Mathur, and Johnathan D. Wensman, Navy Case No. 104,902.

Johnathan D. Wensman, Noel A. Guardala, Veerendra K. Mathur, John F. Currie, "Neutron Spectroscopy Using III-V Semiconductor Scintillators," SPIE Defense, Security, and Sensing (DSS) 2015, SPIE Defense and Security Symposium (Apr. 20-14, 2015), Baltimore, Maryland, Proc. SPIE 9455, Chemical, Biological, Radiological, Nuclear, and Explosives (CBRNE) Sensing XVI, 945502 (May 22, 2015).

Johnathan Wensman, "The Use of Gallium Nitride as a Scintillator in a Fast Neutron Spectrometer," A Dissertation submitted to the Faculty of the Graduate School of Arts and Sciences of Georgetown University in partial fulfillment for the degree of Doctor of Philosophy in Physics, dated Apr. 12, 2019.

U.S. Appl. No. 16/503,095, filed Jul. 3, 2019, entitled "Luminescence-Based Method for Precise Delivery of Ion Beam Therapy," inventors Ross S. Fontenot et al., Navy Case No. 105,643.

Andrew Melton, Eric Burgett, Muhammad Jamil, Tahir Zaidi, Nolan Hertel, Ian Ferguson, "GaN as a Neutron Detection Material," Proceedings of the IEEE SoutheastCon 2010 (SoutheastCon), Mar. 18-21, 2010, Concord, NC, pp. 402-403.

Andrew G. Melton et al., "Comparison of Neutron Conversion Layers for GaN-based Scintillators," Phys. Status Solidi C 9, No. 3-4, published online Dec. 9, 2011, Wiley Online Library.

Praneeth Kandlakunta, "Gamma Rays Rejection in a Gadolinium based Semiconductor Neutron Detector," Dissertation Presented in Partial Fulfillment of the Requirements for the Degree Doctor of Philosophy in the Graduate School of The Ohio State University, 2014.

Jinghui Wang et al., "Review of Using Gallium Nitride for Ionizing Radiation Detection," Applied Physics Reviews 2, 031102 (2015).

Lei R. Cao et al., "Gadolinium-Based GaN for Neutron Detection with Gamma Discrimination," technical report, prepared by the Ohio State University, Defense Threat Reduction Agency, DTRA-TR-16-55, Jun. 2016.

* cited by examiner

N-TYPE GALLIUM NITRIDE SCINTILLATION FOR FAST-NEUTRON DETECTION

CROSS-REFERENCE TO RELATED APPLICATIONS

This application claims the benefit of U.S. provisional application No. 62/570,327, filed 10 Oct. 2017, hereby incorporated herein by reference, entitled "N-Type Gallium Nitride Scintillation for Fast-Neutron Detection," joint inventors Noel A. Guardala, Veerendra K. Mathur, and Johnathan D. Wensman.

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

The present invention relates to nuclear physics, neutron generation, neutron interactions with matter, scintillation properties of III-V solid-state compounds, and radioactivity. More particularly, the present invention relates to use of gallium nitride (GaN) for detection of ionizing radiation.

In physics parlance the term "scintillation" generally refers to production of light by an object when it absorbs ionizing radiation. A "scintillator" is a material that is characterized by scintillation. A scintillator "scintillates" (e.g., luminesces) when it is excited by ionizing radiation; that is, a scintillator material re-emits absorbed energy in the form of light.

Various types of scintillators have been known for detecting ionizing radiation. For instance, successful attempts have been reported using cerium-doped cesium lithium yttrium hexa-chloride (CLYC) for radiation detection. However, the dynamic ranges of the CLYC detectors are limited and complicated due to the capture cross-section behavior of the 35Cl.

Some scintillators are disclosed in the literature that contain a high content of hydrogen atoms. Scintillators of this kind include liquid scintillators, scintillators dissolved in a hydrogenic solvent, and scintillators incorporated in a polymerized hydrocarbon. Coating of polymeric material has been performed onto the front face of a scintillator (typically, an inorganic one), and onto self-contained organic crystals (i.e. anthracene, stilbene). Drawbacks of such approaches involving high hydrogen atom content are relatively low radiative efficiency as well as self-absorption of emitted light.

SUMMARY OF THE INVENTION

According to exemplary practice of the present invention, an n-Type Gallium Nitride (GaN) scintillator is used as a fast-neutron detector. As exemplarily embodied, an inventive device includes an n-type GaN based neutron detector utilizing scintillation properties of GaN coupled with appropriate optical sensing electronics and signal processing hardware.

An exemplary embodiment of the present invention performs as a solid-state, compact, fast neutron spectrometer. An exemplary inventive apparatus is capable of detecting fast neutrons and providing spectroscopic information on the neutron source, while being insensitive to other radiations (e.g., gamma). Furthermore, an exemplary inventive apparatus is capable of being used in a multitude of environments, ranging from controlled laboratory environments to external, challenging physical environments.

With the largest band gap energy of all commercial semiconductors, GaN has found wide application in the making of optoelectronic devices. It has also been used for photodetection such as solar blind imaging as well as ultraviolet and even X-ray detection. People in the physics, astronomy, and nuclear science and engineering communities have traditionally used semiconductors for nuclear particle detection, but their attention may be beginning to turn toward other materials.

The present inventors appreciate several advantages of GaN over silicon (Si), amorphous silicon (a-Si:H), silicon carbide (SiC), amorphous SiC (a-SiC), and gallium arsenide (GaAs), particularly with respect to the radiation hardness of GaN. The present inventors infer the possible usefulness of GaN for alpha detection. It is believed by the present inventors that when properly doped or coated with neutron sensitive materials, GaN can be turned into a neutron detection device. However, the use of the scintillation signals produced from fast neutron scattering on the relatively light mass, $^{14}$N nuclide has not previously been explored.

N-type GaN has been demonstrated to be useful for detection under limited circumstances, i.e., in a detector for thermal neutrons when the n-type GaN is connected to a covering layer that contains the nuclide 6Li. The lithium-6 nucleus will interact with slow neutrons to a large degree, with the production of alpha particles having energies in the vicinity of 4.3 MeV. When those energetic alpha particles interact with the GaN material, it will cause either scintillation that can be recorded using a photomultiplier tube (PMT), or a voltage if the GaN is configured to act as a diode. Prior to the present invention, it was believed that GaN was not sensitive to fast neutrons and would not produce a significant amount of scintillation based on the possible neutron interactions that either or both of Ga nuclei and N nuclei could undergo.

However, in contradistinction to conventional wisdom, the present inventors have demonstrated that the recoil Ga and N ions are sufficiently energetic that the light output from the crystal can be used to identify the energy of incident neutrons and give spectroscopic information related to the source of fast neutrons. That has been demonstrated experimentally by the present inventors by irradiating a n-type GaN wafer attached to a PMT and measuring the response of the GaN crystal to incident fast neutrons of varying energies which were produced using a 3 MV tandem accelerator located at the U.S. Navy's NSWCCD West Bethesda site. The present inventors' investigation of n-type GaN as a semiconductor scintillator for use in a radiation detection system has involved, inter alia, mapping of response functions of an n-type GaN detector crystal over a range of photon and neutron energies, and measurement of light generation in the n-type GaN detector crystal due to proton, alpha, and nitrogen projectiles.

Exemplary inventive practice implements n-type GaN as a gamma-insensitive fast-neutron detector, based on properties of n-type GaN including those relating to direct band-gap, light propagation, and response to ionizing radiation. The present inventors have demonstrated for the first time that fast recoil Ga and N ions can be produced via neutron elastic scattering, and that fast neutron spectrums related to the energies and intensities of various neutron beams can be obtained for energy and flux determinations and in characterizing fast neutron sources.

The present invention may be efficaciously practiced in many applications, such as nuclear physics studies, monitoring of nuclear reactors and materials, and radiation health physics. Medical areas, personnel, and treatment may be inventively monitored for neutron radiation. Under some conditions of medical therapy, inventive practice may detect fast neutrons that are emitted as by-products of beams incident upon patients and surroundings.

Incorporated herein by reference is a one-page abstract submitted by the present inventors, as follows: Noel A. Guardala, Johnathan D. Wensman, and Veerendra K. Mathur, "The Development of a n-type GaN Fast Neutron Spectrometer that is also 'Gamma-Blind'," Bulletin of the American Physical Society, 2016 Annual Meeting of the APS Mid-Atlantic Section, Volume 61, Number 16, Saturday-Sunday, 15-16 Oct. 2016, Newark, Del. (abstract submitted 12 Oct. 2016).

Also incorporated herein by reference is a one-page abstract submitted by the present inventors and others, as follows: Johnathan D. Wensman, Noel A. Guardala, Veerendra K. Mathur, et al., "Use of GaN as a Scintillating Ionizing Radiation Detector," Bulletin of the American Physical Society, 2017 Fall Meeting of the APS Division of Nuclear Physics, Wednesday-Saturday, 25-28 Oct. 2017, Pittsburgh, Pa. (abstract submitted 27 Jun. 2017).

BRIEF DESCRIPTION OF THE DRAWINGS

The present invention will now be described, by way of example, with reference to the accompanying drawings, wherein.

DESCRIPTION OF EXEMPLARY
EMBODIMENTS OF THE INVENTION

Figure 1:
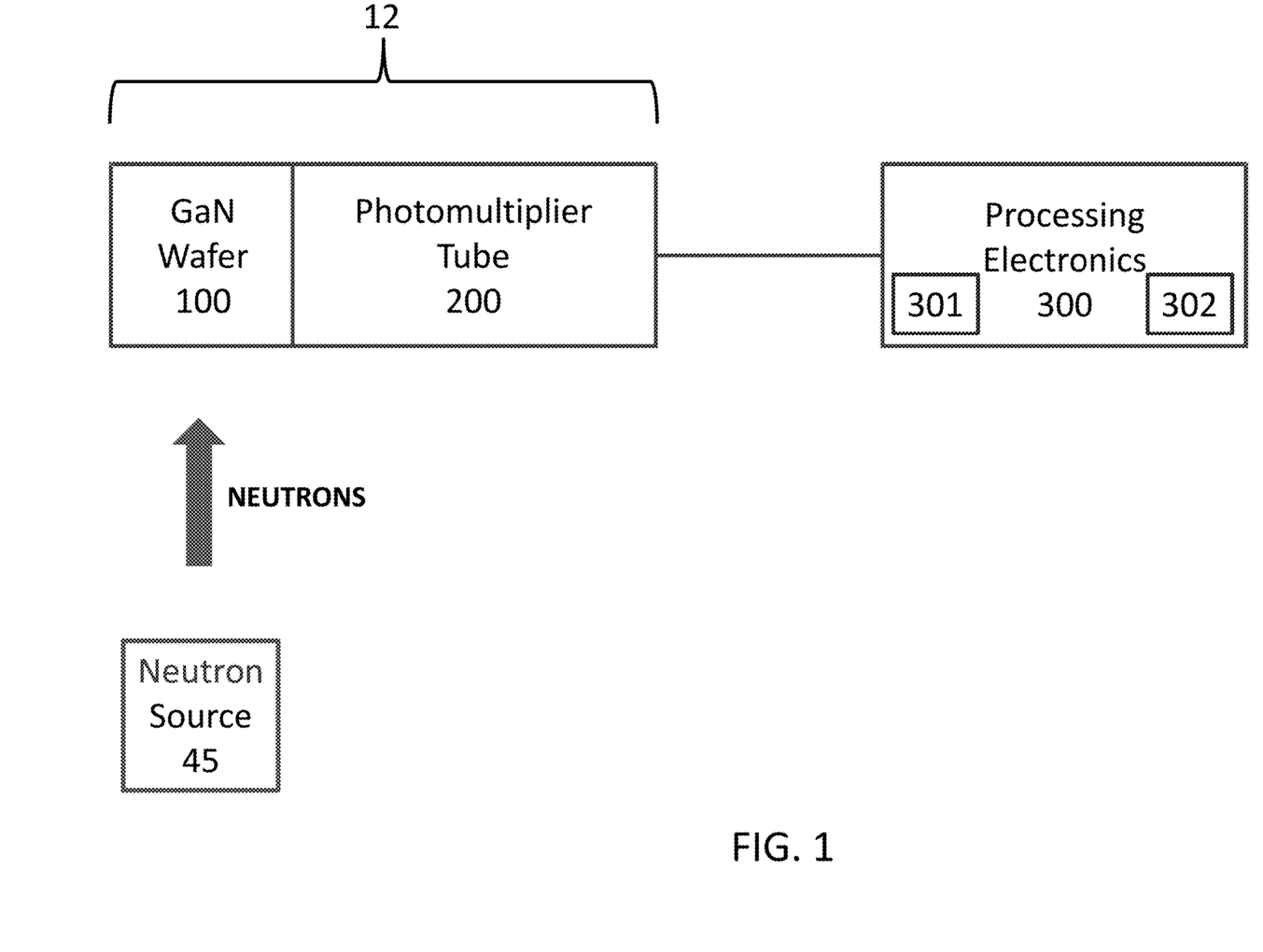
FIG. 1 is a block diagram of an exemplary embodiment of the present invention.

Referring now to FIG. 1, the present inventors constructed a prototype of an inventive detector assembly 12, which included a GaN wafer 100 and a photomultiplier tube (PMT) 200. GaN wafer 100 was optically bonded to PMT 200.

Using the inventive prototype, multiple experiments were performed by the present inventors to prove the capability of their inventive apparatus to measure various neutron signals.

As shown in FIG. 1, an exemplary inventive apparatus includes a GaN wafer 100, a photomultiplier tube (PMT) 200, and a data acquisition system 300 for obtaining data from PMT 200. The wafer of Gallium Nitride (GaN) is optically coupled to the photomultiplier tube (PMT), which is sensitive to the radio-luminescence produced by the GaN during exposure to neutron radiation from a neutron source 45. Neutron source 45 may include, for example, a tandem accelerator and a beryllium target. The output signal of the PMT is then routed through processing electronics and software to produce spectroscopic information pertaining to the neutron energies.

During exemplary operation of inventive apparatus, incident neutrons undergo elastic scattering with nitrogen ions (N-ions) in the GaN crystal 100. The scattered N-ions then produce a scintillation signal, which is observed and measured by the PMT 200 and the processing electronics 300.

According to an inventive prototype, GaN wafer 100 was a 250-micron thick n-type GaN wafer with a diameter of 1 inch, obtained from and manufactured by KYMA Technologies, Inc., 8829 Midway West Road, Raleigh, N.C. 27617. Photomultiplier 200 was a Hamamatsu R329-02 PMT, manufactured by Hamamatsu Photonics K.K. Data acquisition system 300 was a standard PC-based data acquisition system, including a computer 301. Data acquisition system 300 may also include a multichannel analyzer 302 or other electronic component for analyzing signals (e.g., counting pulses) received from PMT 200, wherein computer 301 processes data received from multichannel analyzer 302.

The present inventors believe that, in a mixed neutron-gamma field, an exemplary inventive neutron detector can detect neutrons without interference from gammas. Further, the present inventors believe that the degree of "gamma blindness" of an inventive apparatus may be associated with the thickness of the n-type GaN wafer. According to many exemplary inventive embodiments, an inventively implemented n-type GaN wafer is so thin that a gamma peak will not "show up" or appreciably manifest in a spectrum. According to exemplary inventive practice, the n-type GaN wafer is characterized by a thickness of less than or equal to approximately 600 microns. According to frequent inventive practice, the thickness of the n-type GaN wafer is in the range of greater than zero microns and less than or equal to approximately 300 microns. The terms "micron" and "micrometer" and the symbol "μm" are used interchangeably herein.

Figure 2:
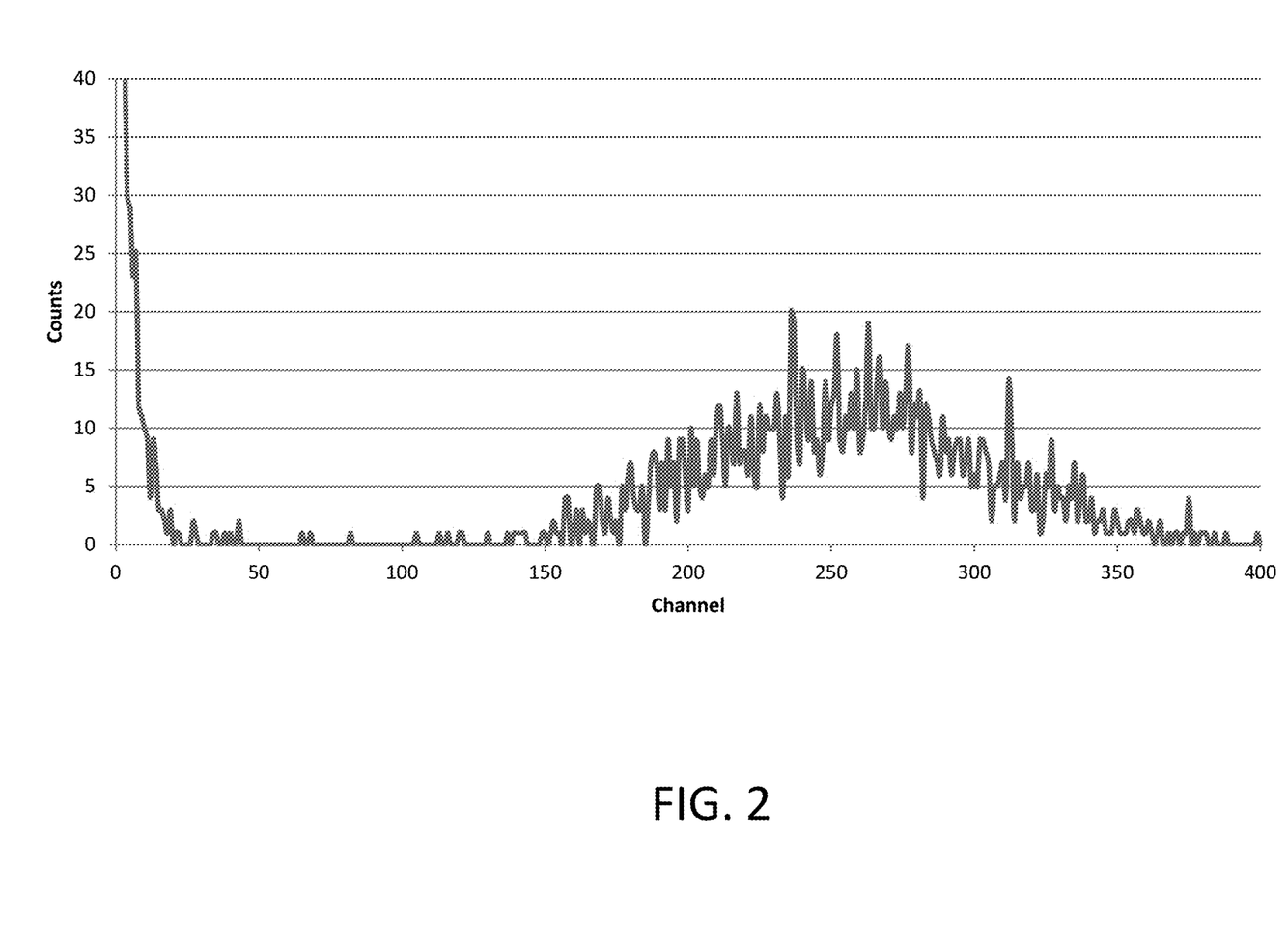
FIG. 2 is a graph illustrating an example of a scintillation spectrum showing the response of n-type GaN to a mono-energetic 1.0 MeV accelerator-produced neutron beam, in accordance with the present invention.

A fast neutron spectrum representative of inventive practice is shown in FIG. 2. The inventive detector 12 was placed approximately 1 meter from a thin beryllium (Be) target approximately 25 microns thick, which was bombarded with a 2.7 MeV proton beam produced at a Navy facility from a 3 MV NEC tandem accelerator Model No. 9SDH-2, thereby creating a mono-energetic, 1.0 MeV neutron field. The neutron spectrum shown in FIG. 2 has a peak corresponding to N-ion recoils with a peak energy produced by 180-degree neutron elastic scattering with energy of approximately 0.280 MeV at channel no. 255.

Figure 3:
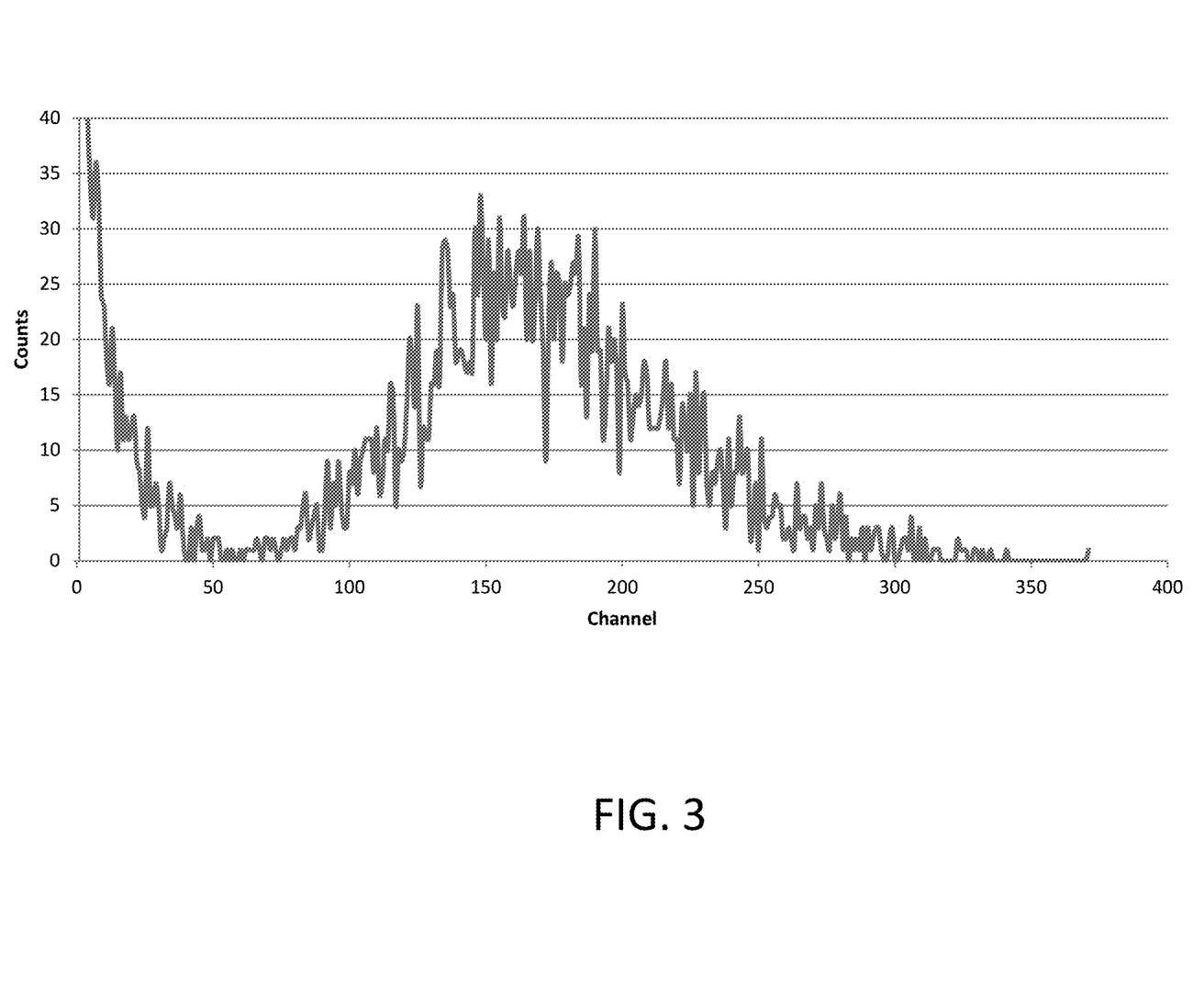
FIG. 3 is a graph illustrating an example of a fast neutron spectrum in GaN using a broad energy neutron beam of 0.800-1.55 MeV, in accordance with the present invention.

Another representative spectrum produced by the present invention's exemplary GaN detector 12 is shown in FIG. 3, this time obtained using 3.55 MeV protons on a relatively thick (254 μm) Be foil at the Navy tandem accelerator. As a result, when placed at a distance of 1 meter the detector is irradiated with ca. 15,000 n/s of broad energy fast neutrons with a spread in energy of 0.800-1.55 MeV based on proton energy loss calculations in the Be foil. The total of N-ions recoil counts under the peak at channel 166 is 2,941, producing 0.33% intrinsic efficiency with a 600 sec collection time.

Figure 4:
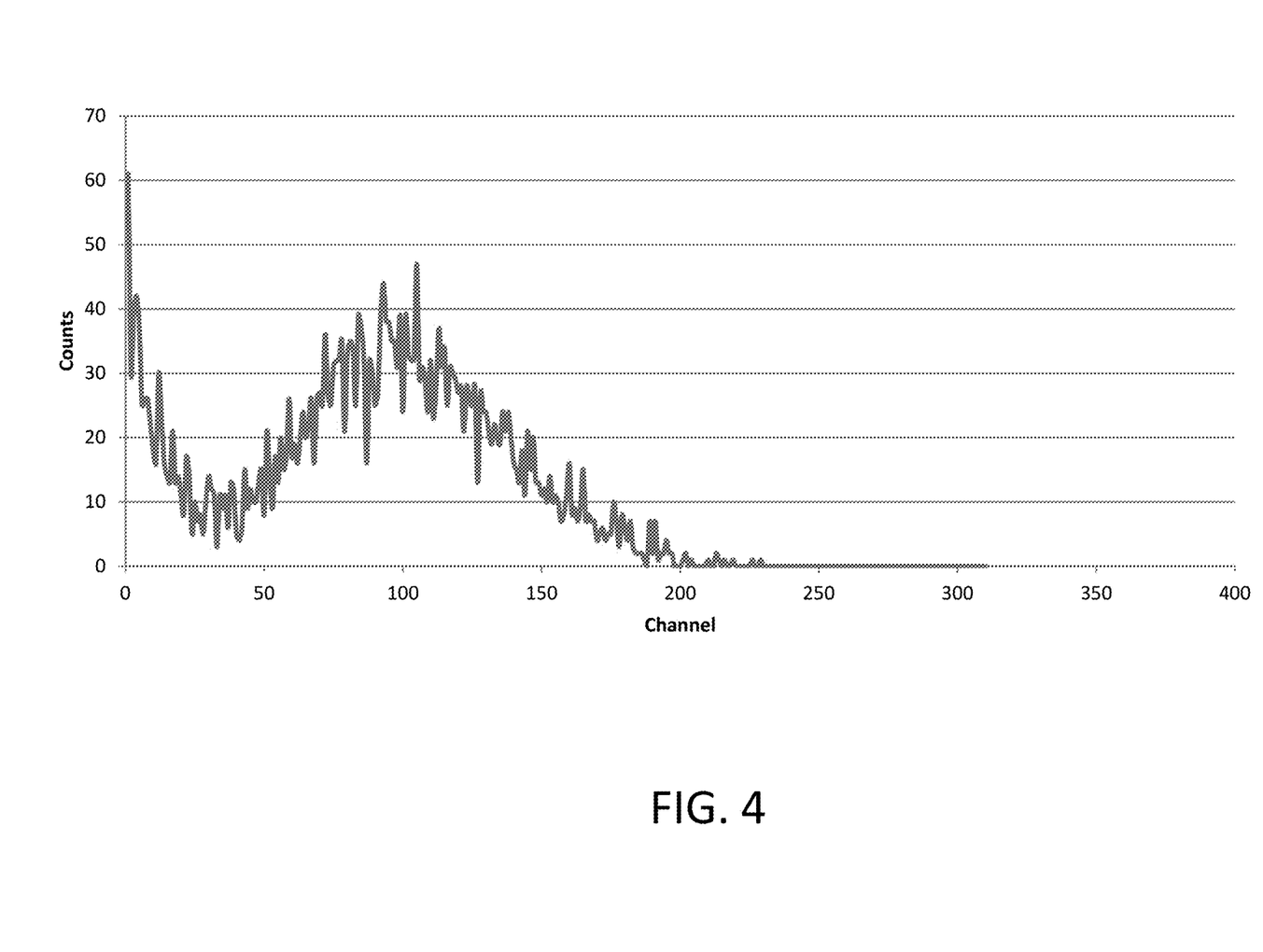
FIG. 4 is a graph illustrating an example of a fast neutron spectrum produced from irradiation of the GaN detector system with a W cover over the GaN and a broad neutron spectrum of 0.800-1.55 MeV, in accordance with the present invention.

In another inventive experiment conducted at the Navy tandem accelerator, a tungsten cover with a thickness of 0.96 cm for the GaN spectrometer was placed for an irradiation using the same neutron producing conditions as FIG. 3. Fast neutron inelastic and elastic scattering from the tungsten resulted in a down-shift of incident neutron energies impinging on the active volume of the GaN scintillator. The resulting shift in the energy spectrum of the neutrons downward is shown in FIG. 4, with the peak now occurring at channel 100 instead of channel 166 as shown in FIG. 3.

Figure 5:
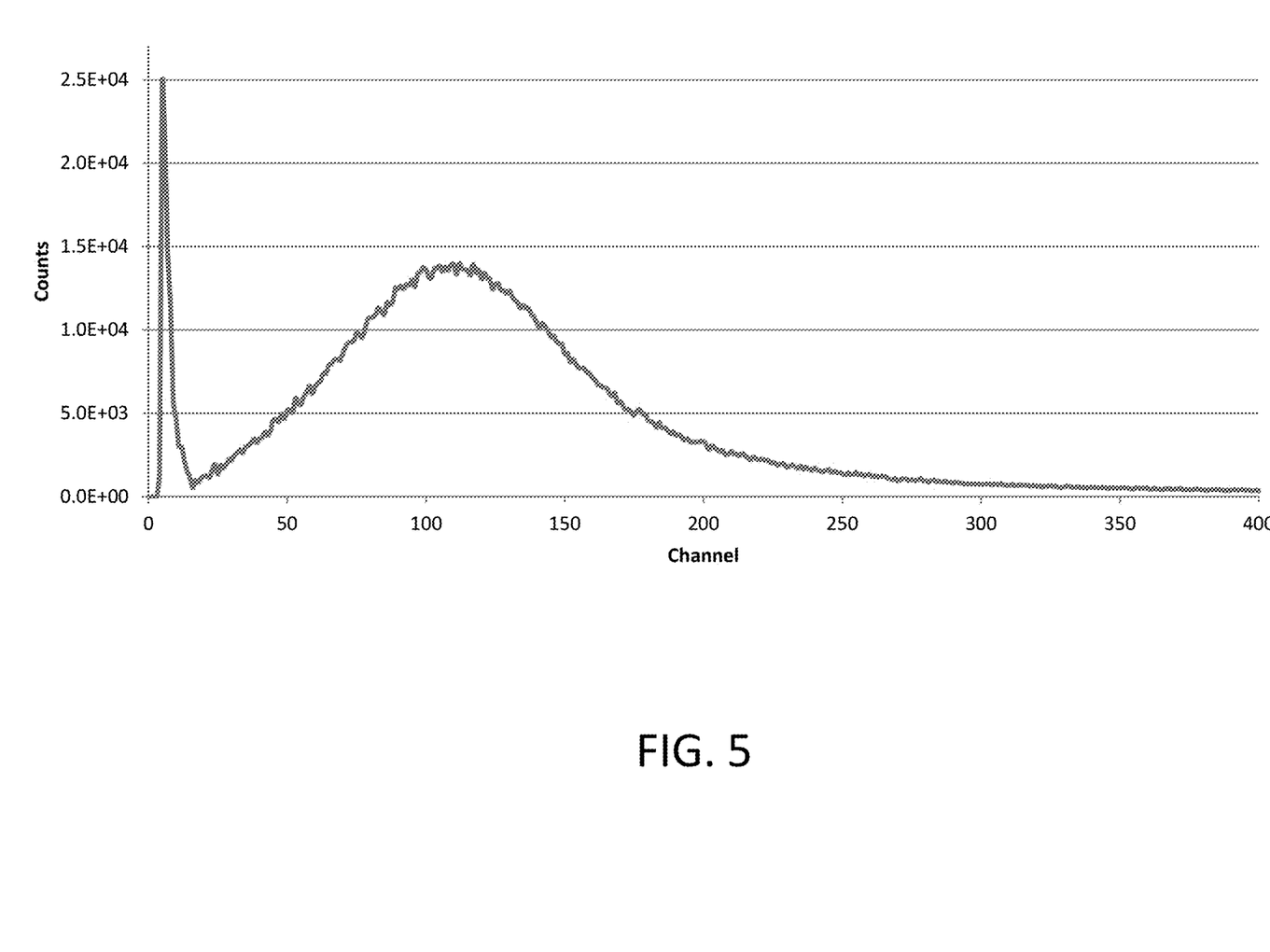
FIG. 5 is a graph illustrating an example of a GaN scintillation spectrum collected using a D-D neutron generator at a United States Navy facility, collected for a period of 600 seconds, in accordance with the present invention.

Supplementary data was collected through inventive practice at zero degrees relative to the neutron emission axis of a Thermo, Inc.@ D-D neutron generator at a Navy facility. Neutrons emitted on the zero-degree axis have a maximum energy of 2.2 MeV, with a spectrum produced by the GaN system during irradiation shown in FIG. 5. The maximum N-ion recoil energy is recorded at channel 117, which corresponds to an amount of energy of approximately 0.620 MeV produced from 180 degree scattering of the incident 2.2 MeV neutrons.

Figure 6:
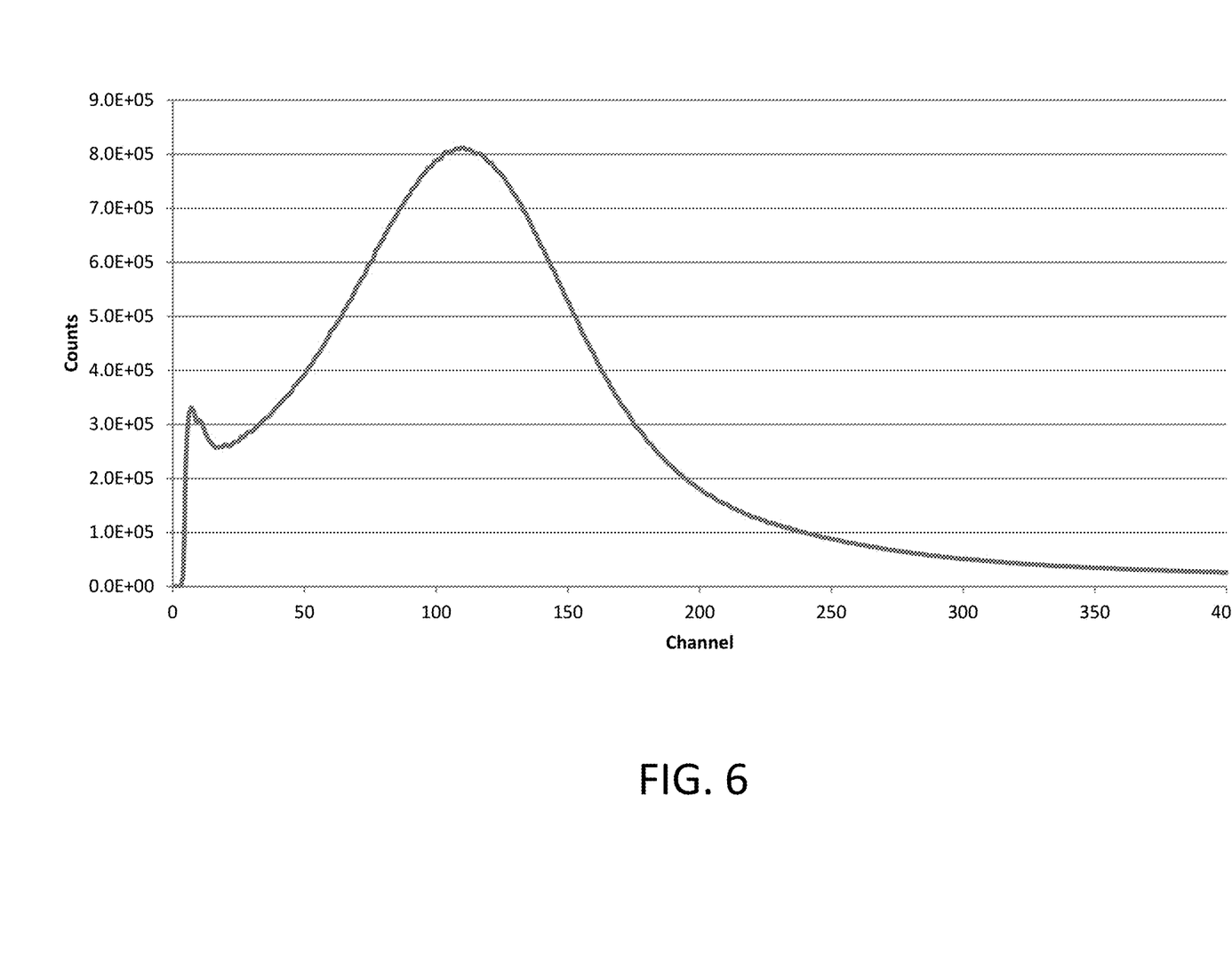
FIG. 6 is a graph illustrating an example of an AmBe spectrum taken at the above-noted Navy facility, in accordance with the present invention.

A spectrum was also collected through inventive practice at a Navy facility using a broad spectrum americium-beryllium (AmBe) fast neutron source 45, which emits approximately $1.44 \times 10^5$ neutrons per second, for 7,165 seconds. The spectrum is shown in FIG. 6, with the peak at channel 12, corresponding to the most likely AmBe fast-neutron energy of approximately 3.5 MeV.

Figure 7:
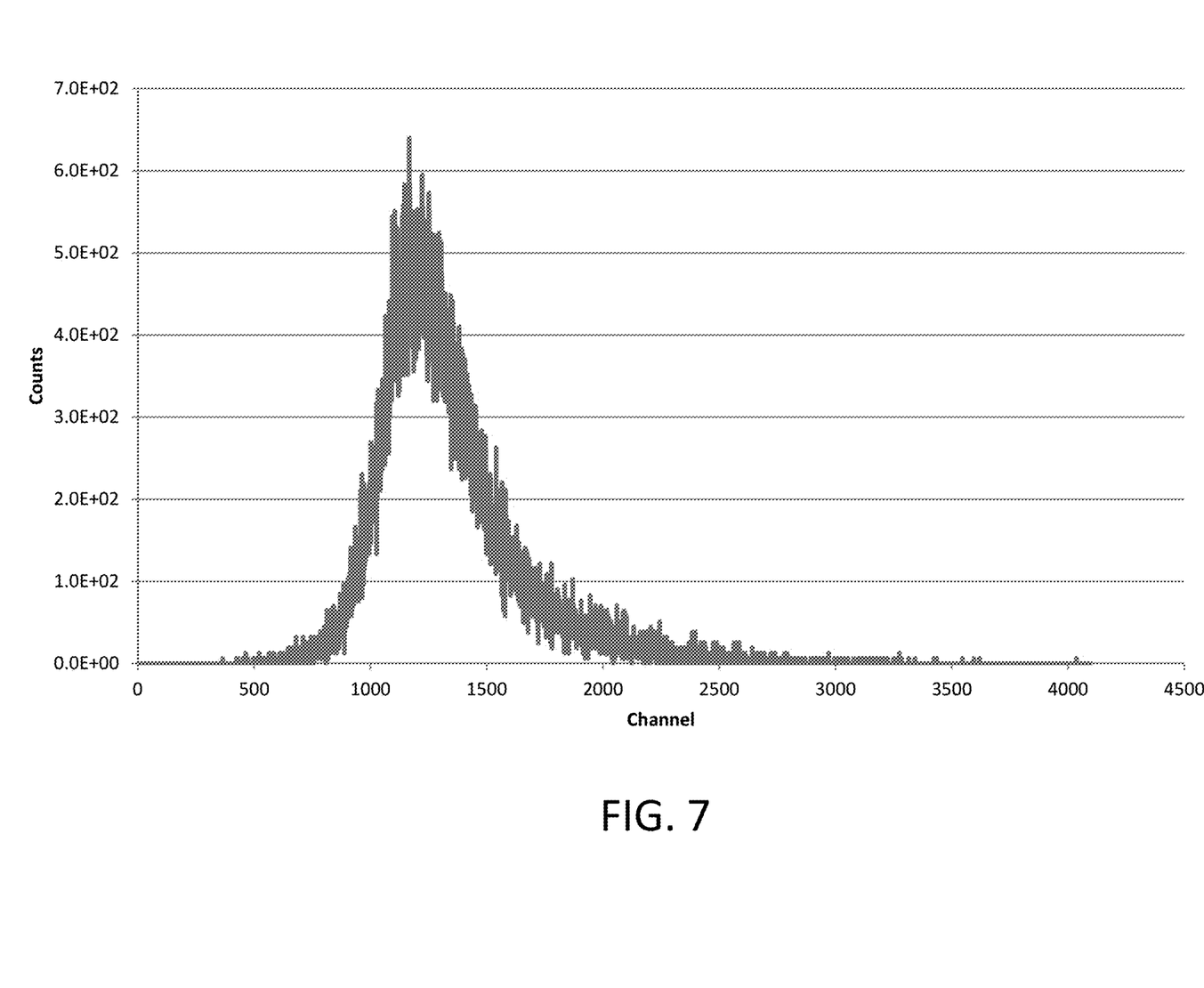
FIG. 7 is a graph illustrating an example of a GaN fast neutron spectrum taken at the above-noted Navy facility using a D-T fast neutron generator having four inches of polyethylene shielding in front to reduce the incident fast neutron flux, in accordance with the present invention.

In addition, at a Navy facility the inventive GaN detector was irradiated with a Thermo, Inc.@ D-T fast neutron generator, which has a maximum fast neutron energy of approximately 14.7 MeV. During irradiation, poly shielding was placed between the generator and detector assembly to reduce the incident flux of neutrons, thereby reducing deadtime in the detector. A representative spectrum is shown in FIG. 7. A peak in the spectrum is seen at channel 1220 corresponding to a N-recoil ion energy of 4.10 MeV.

An exemplary neutron detection system in accordance with the present invention affords a number of advantages, including the following: First, an exemplary inventive detector is insensitive to gamma rays and thermal neutrons. Second, an exemplary inventive detector is compact and easily handled in all counting situations, either in the laboratory or in field/on-site operations, including inside a nuclear power plant or Navy vessel. Third, an exemplary inventive detector is relatively inexpensive and can implement commercial-off-the-shelf-based (COTS-based) components in its entirety. Fourth, the relevant fast-neutron data is acquired in real time without any extensive data analysis. Extensive data analysis is not required according to exemplary inventive practice because the inventive system is insensitive to other radiations. In contrast to exemplary inventive practice, extensive data analysis is required for conventional practice because the conventional system is not insensitive to other radiations, thus requiring a pulse shape discrimination timing system. Fifth, the obtaining of data through exemplary inventive practice is easily compatible with all or nearly all PC-based data acquisition systems.

Scintillators are potentially valuable for implementation in methodologies for area monitoring of nuclear objects and facilities. The present inventors have considered alternative methodologies—for instance, methodologies that are based on liquid, plastic, organic compounds and non-III-V solid-state scintillators. Generally, these alternative approaches considered by the present inventors are very expensive and do not lend themselves to implementation as COTS-based systems such as may be used by DOD or other government agencies, either as a research tool or as a field-deployable instrumental system. Some of the alternative methods considered by the present inventors may involve the use of costly and complex materials.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A neutron detection apparatus comprising a fast neutron source, an n-type GaN wafer, a photomultiplier tube, and a data acquisition system for performing measurements with respect to said signals generated by said photomultiplier tube, wherein:

said n-type GaN wafer is made of n-type GaN crystal;

said n-type GaN wafer and said photomultiplier tube are optically coupled;

said fast neutron source is capable of irradiating said n-type GaN wafer with fast neutrons so that incident said fast neutrons undergo elastic scattering characterized by elastic recoil of ions, said ions being Ga ions, or N ions, or both Ga ions and N ions;

scintillation of said n-type GaN wafer occurs upon said elastic recoil of said ions;

said n-type GaN wafer is characterized by a thickness of less than or equal to approximately 600 μm;

said n-type GaN wafer is sufficiently thin that gamma radiation will not appreciably manifest in said measurements.

2. The neutron detection apparatus of claim 1, wherein said n-type GaN wafer is characterized by a thickness of less than or equal to approximately 300 μm.

3. A neutron detection method comprising:

irradiating an n-type GaN wafer with fast neutrons, said n-type GaN wafer made of n-type GaN crystal, wherein incident said fast neutrons result in elastic recoil of ions selected from the group consisting of Ga ions and N ions;

sensing scintillation of said n-type GaN wafer, said scintillation of said n-type GaN wafer occurring in response to said fast neutron irradiation, wherein said scintillation of said n-type GaN wafer is associated with said elastic recoil of said ions;

producing output signals;

processing said output signals to produce spectroscopic information pertaining to neutron energies associated with said fast neutron irradiation of said n-type GaN wafer;

selecting said n-type GaN wafer as having a thickness sufficiently small that gamma radiation will not appreciably manifest in said spectroscopic information.

4. The neutron detection method of claim 3, wherein said sensing of said scintillation of said n-type GaN wafer includes optically coupling said n-type GaN wafer with a photodetector, and using said photodetector with respect to said scintillation of said n-type GaN wafer.

5. The neutron detection method of claim 4, wherein said photodetector includes a photomultiplier tube, and wherein said photomultiplier tube produces output signals, and wherein the method further comprises processing said output signals to produce spectroscopic information pertaining to neutron energies associated with said fast neutron irradiation of said n-type GaN wafer.

6. A neutron detection method comprising:
irradiating an n-type GaN wafer with fast neutrons, said n-type GaN wafer made of n-type GaN crystal, wherein incident said fast neutrons result in elastic recoil of ions selected from the group consisting of Ga ions and N ions;
sensing scintillation of said n-type GaN wafer, said scintillation of said n-type GaN wafer occurring in response to said fast neutron irradiation, wherein said scintillation of said n-type GaN wafer is associated with said elastic recoil of said ions;
selecting said n-type GaN wafer as having a thickness sufficiently small that the neutron detection method is at least substantially insensitive to gamma radiation.

7. The neutron detection method of claim 6, wherein said sensing of said scintillation of said n-type GaN wafer includes optically coupling said n-type GaN wafer with a photodetector, and using said photodetector with respect to said scintillation of said n-type GaN wafer.

8. The neutron detection method of claim 6, wherein said n-type GaN wafer has a thickness of less than or equal to approximately 600 μm.

9. The neutron detection method of claim 6, wherein said n-type GaN wafer has a thickness of less than or equal to approximately 300 μm.

10. The neutron detection method of claim 7, wherein said photodetector includes a photomultiplier tube.

11. The neutron detection method of claim 10, wherein said photomultiplier tube produces output signals, and wherein the method further comprises processing said output signals to produce spectroscopic information pertaining to neutron energies associated with said fast neutron irradiation of said n-type GaN wafer.

12. A neutron detection apparatus comprising a fast neutron source, an n-type GaN wafer, and a photomultiplier tube, wherein:
said n-type GaN wafer is made of n-type GaN crystal;
said n-type GaN wafer and said photomultiplier tube are optically coupled;
said fast neutron source is capable of irradiating said n-type GaN wafer with fast neutrons so that incident said fast neutrons undergo elastic scattering characterized by elastic recoil of ions, said ions being Ga ions, or N ions, or both Ga ions and N ions;
scintillation of said n-type GaN wafer occurs upon said elastic recoil of said ions;
measurable signals are generated by said photomultiplier tube in response to said scintillation of said n-type GaN wafer;
said n-type GaN wafer is sufficiently thin that gamma radiation will not appreciably manifest in said measurable signals.

13. The neutron detection apparatus of claim 12, further comprising a data acquisition system for performing measurements with respect to said signals generated by said photomultiplier tube.

14. The neutron detection apparatus of claim 12, wherein said n-type GaN wafer has a thickness of less than or equal to approximately 600 μm.

15. The neutron detection apparatus of claim 12, wherein said n-type GaN wafer has a thickness of less than or equal to approximately 300 μm.

* * * * *